United States Patent

Klimek et al.

[11] 3,923,346
[45] Dec. 2, 1975

[54] DUAL CIRCUIT BRAKE VALVE

[75] Inventors: Boleslaw Klimek, Des Plaines; James W. Ma, Northbrook, both of Ill.

[73] Assignee: The Berg Manufacturing Company, Des Plaines, Ill.

[22] Filed: Dec. 10, 1973

[21] Appl. No.: 423,166

Related U.S. Application Data

[63] Continuation-in-part of Ser. No. 365,123, May 30, 1973, abandoned.

[52] U.S. Cl. .................................. 303/52; 303/40
[51] Int. Cl.² ........................................ B60T 15/06
[58] Field of Search ............ 303/52, 54, 50, 40, 28, 303/6 R; 137/505.12, 505.18, 510, 627.5

[56] References Cited
UNITED STATES PATENTS

| | | | |
|---|---|---|---|
| 3,183,042 | 5/1965 | Bueler | 303/52 |
| 3,236,567 | 2/1966 | Alfieri | 303/52 X |
| 3,265,447 | 8/1966 | Bueler | 303/52 |
| 3,291,539 | 12/1966 | Bueler | 303/52 |
| 3,355,223 | 11/1967 | Klimek | 303/52 |
| 3,390,920 | 7/1968 | Dobrikin | 303/52 |
| 3,507,545 | 4/1970 | Page et al. | 303/40 X |
| 3,580,646 | 5/1971 | Ternent | 303/54 X |
| 3,712,685 | 1/1973 | Hoffmann | 303/54 X |
| 3,809,441 | 5/1974 | Klimek | 303/52 |
| 3,830,549 | 8/1974 | Kito et al. | 303/52 X |

Primary Examiner—Trygve M. Blix
Assistant Examiner—Douglas C. Butler
Attorney, Agent, or Firm—Neuman, Williams, Anderson & Olson

[57] ABSTRACT

A brake application valve is used to connect two supply tanks to two different brake systems. The valve has a pair of shuttle members which normally close communication between the inlets and the outlets and open communication between the outlets and exhaust. There are two pistons, movement of which is effective to move the shuttle members to open communication between the inlets and outlets and close communication to the exhaust. One of the pistons has a mechanical connection with the second or inner piston to the effect that movement of the first piston causes initial movement of the second piston with fluid pressure, made available by the initial opening of communication between the first inlet and outlet, causing subsequent movement of the second or inner piston.

16 Claims, 3 Drawing Figures

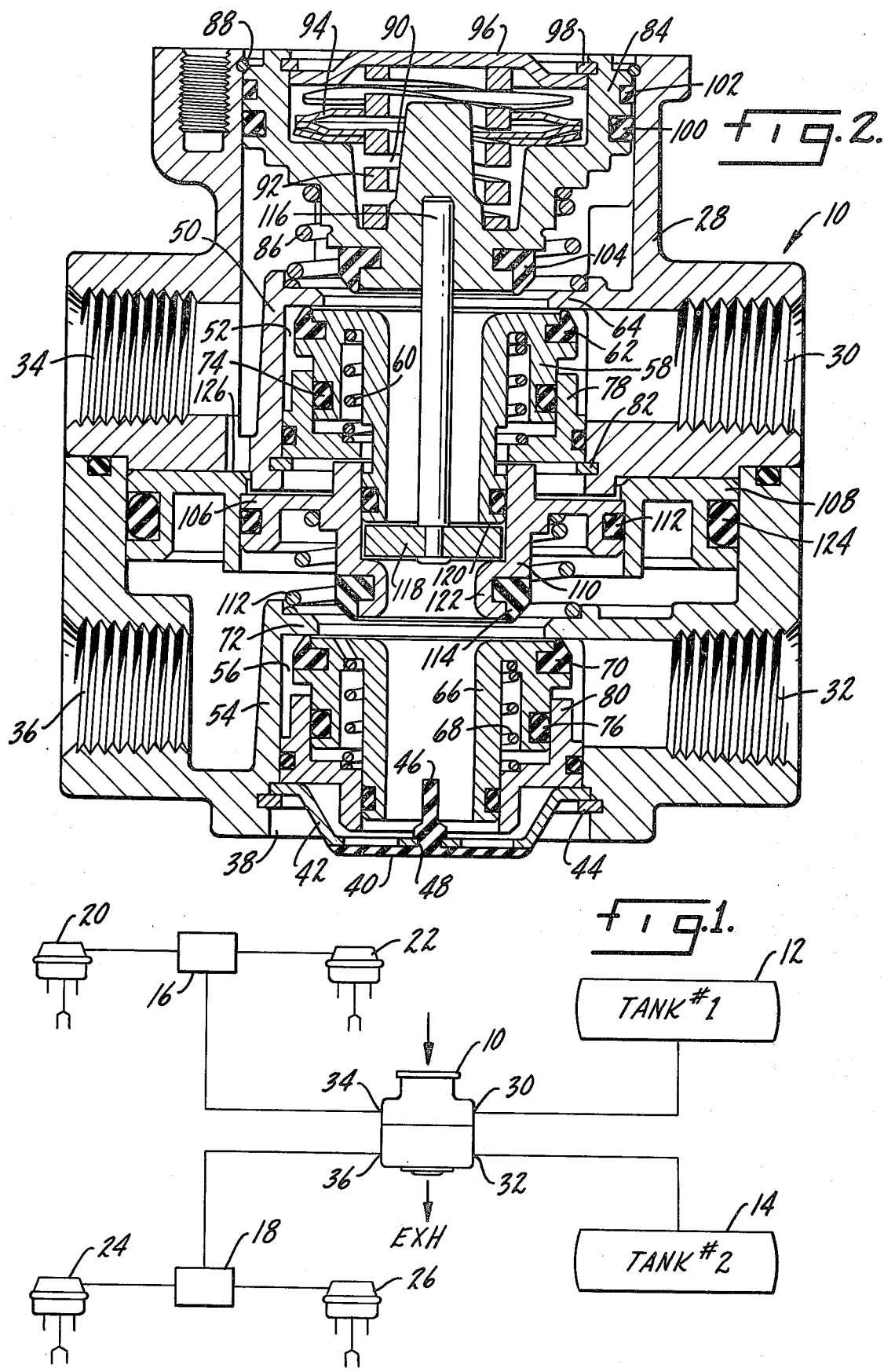

DUAL CIRCUIT BRAKE VALVE

This application is a continuation-in-part of our copending application Ser. No. 365,123 filed May 30, 1973 now abandoned.

SUMMARY OF THE INVENTION

The present invention relates to a dual foot application valve for use in the air brake system of tractor-trailers and has particular application to a means for operating one portion of the valve in response to operation of a first portion.

A primary purpose of the invention is an application valve of the type described in which a second piston is moved both by mechanical means and by air pressure in response to movement of the first piston.

Another purpose is a brake application valve of the type described in which there are a pair of pistons, with the second or inner piston having one or two separate portions.

Another purpose is a brake application valve of the type described in which there is a mechanical connection between the first and second pistons.

Another purpose is a brake application valve utilizing springs having differing spring rates.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a portion of a vehicle air brake system, FIG. 2 is a section through the brake application valve disclosed herein.

DESCRIPTION OF THE PREFERRED EMBODIMENT

Figure 3:
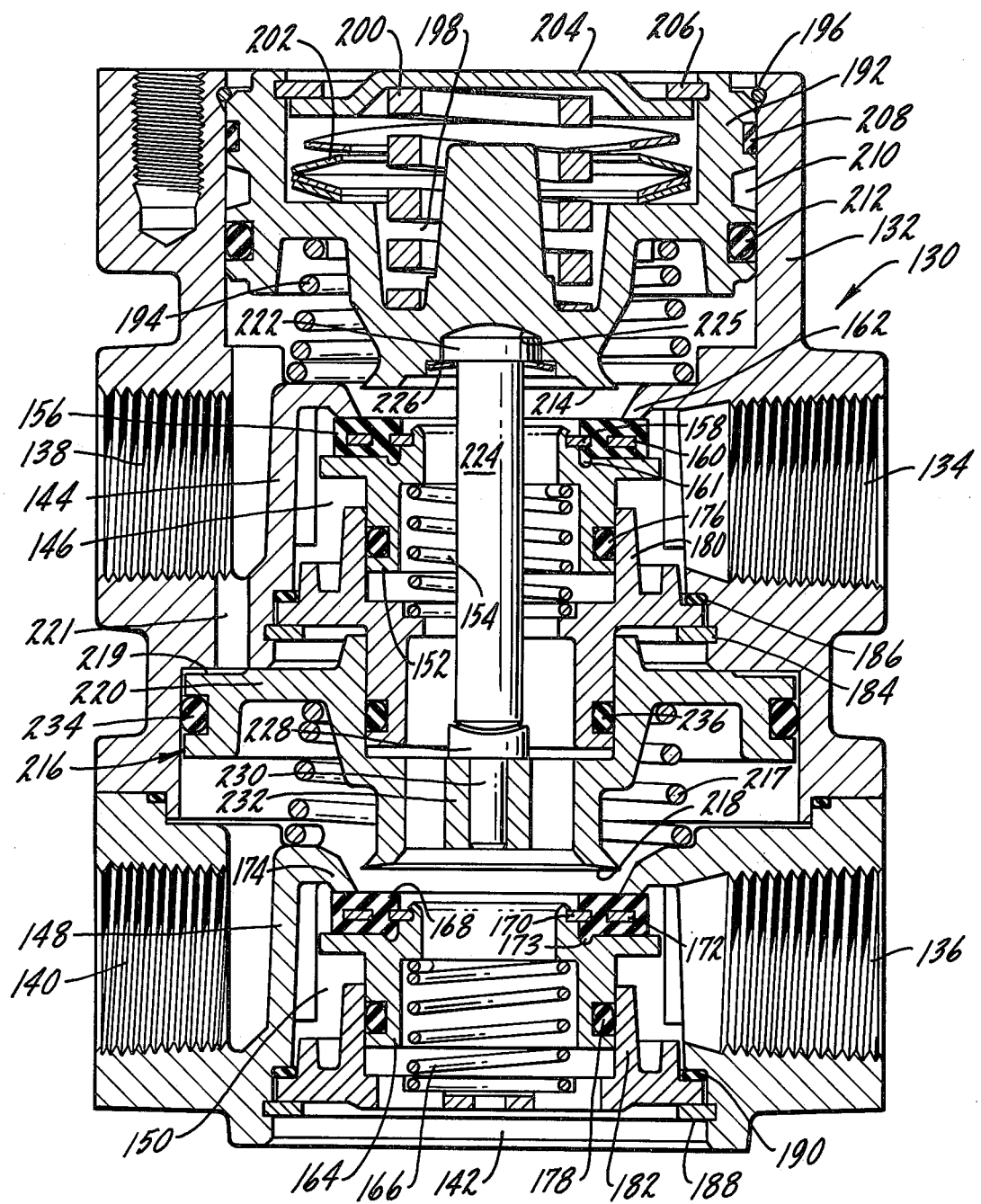
FIG. 3 is a section similar to FIG. 2 through a modified form of the invention.

In FIG. 1 the inlets of a brake application valve 10 are connected to a first tank 12 and a second tank 14. The outlets of the brake application valve 10 are connected respectively to a first relay valve 16 and a second relay valve 18. The first relay valve 16 may be connected to brake cylinders 20 and 22, with the second relay valve 18 being connected to brake cylinders 24 and 26. The brake application valve 10 which may be a footoperated valve, used by the vehicle operator in his cab, is effective to operate two entirely different brake systems, each having separate sources of pressure and separate brake cylinders.

The valve 10 is shown in detail in FIG. 2 and includes an outer housing 28 having a first inlet 30 and a second inlet 32. The housing 28 similarly has a first outlet 34 and a second outlet 36. An exhaust port 38 may have a flapper valve 40 forming a closure therefor, with the flapper valve conventionally being operated to permit air pressure within the valve to exhaust. The flapper valve 40 may be mounted to a diaphragm plate 42 by an inwardly-extending projection 46 which passes through an opening 48 in the diaphragm plate. The plate 42 is mounted on the housing 28 by a retaining ring 44.

The housing 28 may have an inner wall 50 defining a first chamber 52 and a second inner wall 54 defining a second chamber 56. Movable within the first chamber 52 is a first shuttle 58 biased by a return spring 60 to the position of FIG. 2 in which a seal member 62 mounted at one end of the shuttle 58 seals against an inner portion 64 of the housing. Thus, the first inlet 30 is normally sealed from the first outlet 34 as the shuttle 58 has closed communication between these ports.

In like manner, there is a second shuttle 66 positioned within the second chamber 56 and urged to the position of FIG. 2 by a return spring 68.

The second shuttle 66 has a seal member 70 which seals against a portion 72 of the housing when the shuttle is in the closed position of FIG. 2, thus normally closing off communication between the second inlet 32 and the second outlet 36. Each of the shuttles 58 and 66 may mount seal rings 74 and 76 respectively, which form seals between the outside surface of the shuttles and inside peripheral surfaces of shuttle retainers 78 and 80. Shuttle retainer 78 is fixed in position by a retaining ring 82, while shuttle retainer 80 is held in position by the upper surface of the diaphragm plate 42.

A first piston is indicated at 84 and is spring-biased to the position of FIG. 2 by a return spring 86 which bottoms against the upper end of wall 50. A retaining wire 88 prevents outward movement of the piston 84. Positioned within a chamber 90 in piston 84 is a first spring 92 and a second spring 94, with both springs being retained within the chamber 90 by a cover 96 fixed in position by a retaining ring 98. As can be seen from the drawing, springs 92 and 94 have different spring rates, thus manual pressure applied to the cover 96, for example by the vehicle operator's foot, will first compress spring 92 and after a predeteremined movement of cover 96, spring 94 will be compressed. It will take a much greater force to compress spring 94 than to compress spring 92 because of the differing spring rates.

The outer surface of piston 84 may have seal rings 100 and 102 which seal against the interior surface of the housing 28.

The lower end of piston 84 may have a seal member 104 which will seal against the shuttle 58 when the piston has been moved inwardly upon operation of the valve. It should be noted that seal 104 is positioned radially inside of seal 62.

A second piston 106 has an outer portion 108 and an inner portion 110, there being a seal ring 112 forming a seal between the inner and outer portions. A return spring 113 biases the piston 106 to the piston of FIG. 2. A seal member 114 is formed at the bottom of piston 106 and will form a seal with the second shuttle 66 when the piston moves away from the position of FIG. 2 in the same manner as described in connection with piston 84. Note again that seal ring 114 is radially inside of seal member 70.

An actuating rod 116 is fixed to the first piston 84 and extends inwardly through shuttle 58 and has a bridge 118 at its lower end. The bridge 118 is positioned between, in the position of FIG. 1, the lower end 120 of the first shuttle 58 and an inwardly-extending portion 122 of the second piston 106. The second piston 106 is completed by an outer peripheral seal ring 124 which forms a seal between the piston 106 and an interior wall of the housing 28.

In operation, normally there is no communication between the tanks 12 and 14 and the relay valves 16 and 18 and thus no air pressure is applied to the various brakes shown in FIG. 1. When the operator causes the cover 96 to be moved inwardly, by manual application to his foot as an example, first spring 92 will be moved inward, which as described hereinafter, will permit a predetermined air pressure to be applied to the brakes. The amount of air pressure applied is directly related to the force applied to spring 92 and as long as only spring 92 is being compressed, there is a straight line relationship between the applied force and the air pressure applied to the brakes. At such time as the cover 96 has been moved inward to the point where spring 94 is also being compressed, the relationship between applied force and air pressure changes to a different straight line relationship. Thus, for light brake applications, spring 92 is effective, whereas, when there is to be a heavier or more drastic brake application, both springs are effective, with the result that a much shorter stroke or movement of cover 96 will supply a substantially greater brake applying force.

Under normal conditions, when spring 92 is compressed, piston 84 will move inward to the point where seal 104 will seal against the shuttle 58 and the piston will move the shuttle away from its seal with the portion 64 of the housing. This will open communication between the first inlet 30 and the first outlet 34. The degree of opening is determined by the force applied to spring 92 and the air pressure from the inlet will immediately balance against the spring force such that the amount of spring force will directly determine the amount of applied air pressure sent to the brake system. The greater the movement of the first piston 84, the greater the communication between the inlet and outlet, and thus the greater the air pressure applied to the relay valve 16.

At the same time as piston 84 is causing inward movement of shuttle 58, bridge 118 will push down against the projection 122 on the second piston 106 to cause initial movement of the second piston away from the position shown in FIG. 2. As soon as the piston has moved away from its shown position, there will be an application of air pressure to the upper surface 126 of piston portion 108, as this surface will be in direct communication with the first outlet 34. Thus, the second piston will thereafter be moved by the application of air pressure which will cause the second piston to follow movement of the first piston and to move the second shuttle 66 in the same manner as the first shuttle to open communication between the second inlet 32 and the second outlet 36. Although there is resistance to movement of the secon piston because of the friction between O-ring 124 and the inside surface of the housing 28, this friction is more than overcome by the substantial surface 126 which is open to the air pressure available at the outlet 34. Since the force created by the application of air pressure on surface 126 varies as the square of the radius, whereas, the frictional resistive force provided at O-ring 124 varies directly with the radius, the greater the radius of the portion 108 of the second piston 106, the faster the reaction of the second piston to movement of the first piston. Thus, there is rapid movement by the second piston in response to movement of the first piston.

As indicated above, under normal operating conditions both tanks will be connected with both brake systems when there is application of external force to the cover 96. The second piston primarily operates in response to air pressure applied at the first outlet. In the event that there is a failure in the first system in such a manner as to preclude the application of air pressure to surface 126, nevertheless, there still will be an operation of the second system inasmuch as bridge 118 will then provide the total force for moving the second piston in response to movement of the first piston and thus move the second shuttle to open communication between inlet 32 and outlet 36. In this manner, because of the mechanical interconnection between the two pistons, even if there is a failure in one of the air systems, the other air system can still operate off of the same foot pedal application of brake power.

It is important to have shuttle seal members 62 and 70 radially outside of piston seal members 104 and 114. In this way air pressure present at the inlets will assist in moving the shuttles along with the applied force from the pistons.

Valve 130 shown in FIG. 3 is another embodiment of the brake application valve 10 shown in the vehicle air brake system of FIG. 1. Valve 130 includes an outer housing 132 having a first inlet 134, a second inlet 136, a first outlet 138 and a second outlet 140. An exhaust port 142 which opens through the bottom of the outer housing 132 is normally in direct communication with the first and second outlets 138 and 140 as shown in the position FIG. 3 so as to allow air pressure within the valve to exhaust.

An inner wall 144 of the housing 132 defines a first chamber 146 and a second inner wall 148 defines a second chamber 150. A first shuttle 152 moves within the first chamber 146 and is biased by a return spring 154 to its closed position of FIG. 3 in which a seal member 156 having inner and outer steel rings 158 and 160 is secured to one end of the shuttle and abuts against an inner lip portion 162 of the housing. Likewise, a second shuttle 164 positioned within the second chamber 150 is also urged to the position of FIG. 3 by a return spring 166. The second shuttle 164 also has a seal member 168 containing inner and outer steel rings 170 and 172. The seal members 156 and 168, which may be interchangeable are fixed in position at the end of their shuttles 152 and 164 by means of their inner steel rings 158 and 170 as well as by protrusions 161 and 173 along the inner edge of the bottom of each seal member respectively. Seal member 168 seals against a portion 174 of the housing when the second shuttle 164 is in its closed position of FIG. 3. Shuttles 152 and 164 may mount seal rings 176 and 178 respectively to form seals between the outside surface of the shuttles and inside peripheral surfaces of shuttle retainers 180 and 182. The first shuttle retainer 180 is held in a fixed position within the housing 132 by a retaining ring 184 and seal ring 186. Likewise the second shuttle retainer 182 is held in position by its retaining ring 188 and seal ring 190.

A first piston 192 is spring-biased to its position of FIG. 3 by a return spring 194 which bottoms against the turned-in upper end of wall 144. A retaining wire 196 prevents outward movement of the piston 192. Positioned within a chamber 198 are first and second springs 200 and 202 having different spring rates, both springs being retained within the chamber 198 by a cover 204 which is held in position by a retaining ring 206. The outer surface of piston 192 may have upper and lower seal rings 208 and 212 with an annular groove 210 between them, all for sealing against the interior surface of the housing 132. The lower end of the piston 192 is flared outward and flat on the bottom to form a contact surface 214 for sealing against the top inner surface of seal member 156 as the piston 192 is moved inwardly upon operation of the valve.

A second piston 216 is slideably disposed within the valve housing 132 and biased to the position of FIG. 3 by a return spring 217. The bottom edge of the second piston 216 is flared outward to form the flat bottom contact surface 218 which seals against the top inner edge of the seal member 168 of the second shuttle 164 as the second piston 216 moves away from its position of FIG. 3.

A narrow annular area 219 adjacent the outer perimeter of the top surface of the laterally extending portion 220 of the second piston 216 is disposed slightly lower than the inner surface of the same portion 220 such that a shallow annular pocket is formed between the outer housing 132 and the lower area 219 of the laterally extending portion 220 of the second piston 216. This pocket is directly connected by an open channel 221 to the first outlet 138. Thus as air pressure is caused to be applied to the first outlet 138 by depression of the valve cover 204, the air pressure is concurrently applied to the lower area 219 of the laterally extending portion 220 of the second piston 216 to assist in moving the second piston 216 downward.

The first and second pistons 192 and 216 are mechanically linked by an actuating rod or bridge 224. A hole 225 is cut into the center of the bottom surface of the first portion 192 for snuggly receiving the entire head 222 of the actuating rod 224, the head being wider in diameter than the rod and having a spherically curved top surface. A retaining ring 226 holds the head 222 of the actuating rod 224 within the specially cut hole 225. The actuating rod extends from the bottom surface of the first piston 192 through the first shuttle 152 and first shuttle retainer 180 to a seat 228 mounted on the second piston 216. The rod seat 228 has a concave top surface for receiving the spherically curved end of the actuating rod 224 and a downward extending shaft member 230 which is held by an upstanding circular member 232 of the second piston 216. A sealing ring 234 may be placed between the second piston 216 and the surface of the outer housing 132. A second sealing ring 236 may be disposed within the outer surface of the first shuttle retainer 180 adjacent its lower end to form a seal between the second piston 216 and the first shuttle retainer 180.

In operation, the brake application valve 130 in FIG. 3 functions similarly to the embodiment of valve 10 shown in FIG. 2 and described herein. The modifications incorporated into valve 130 are as follows. Seals 62 and 104 have been eliminated and replaced by a widened contact surface 214 of the first piston 192 and a single seal member 156 which is rubber with two steel rings 158 and 160 embedded in it, the seal 156 being fixed to the first shuttle 152 by its inner ring 158. In the closed position shown in FIG. 3, this seal 156 seals against a lip portion 162 of the housing 132 and in the opened position it seals against the widened contact surface 214 of the piston 192 as the piston 192 moves downward. Likewise, seals 70 and 114 have been replaced by the widened contact surface 218 of the second piston 216 and a single seal member 168 affixed to the second shuttle 164.

In place of the rigidly held actuating rod 116 shown in FIG. 2 the integral head 222 of an actuating rod 224 is fitted into a specially cut hole 225 in the first piston 192. The bottom end of rod 224 rests on the concave surface of a rod seat 228 mounted in the inner circular member 232 of the modified second piston 216. Both ends of rod 224 are spherically curved to allow for any cocking of the first or second pistons. Thus the pistons do not have to be strictly in alignment for the valve to satisfactorily operate.

A single unit second piston 216 is used in valve 130 in place of the two part second piston 106 shown in FIG. 2. The operation is the same in both valves, however in that a mechanical means is provided for opening the connection between the second inlet 136 and second outlet 140 in the event there is no air pressure at the first outlet 138 to assist in opening the second piston 216.

Again it is important to have shuttle seal members 156 and 168 radially outside of the piston contact surfaces 214 and 220 so as to allow the pressure present at the inlets to assist in moving the shuttles along with the applied force from the pistons.

Whereas the preferred forms of the invention have been shown and discribed herein, it should be realized that there may be many modifications, substitutions and alterations thereto.

The embodiments of the invention in which an enclusive property or privilege is claimed are defined as follows:

1. A brake application valve including a housing having a first inlet and a first outlet, a second inlet and a second outlet and an exhaust outlet, a first shuttle in said housing normally closing communication between said first inlet and outlet, a second shuttle in said housing normally closing communication between said second inlet and outlet, said shuttles normally maintaining communication between said outlets and said exhaust outlet, a first piston in said housing yieldingly urged away from said first shuttle, a second piston in said housing yieldingly urged away from said second shuttle, mechanical means fixed to said first piston and positioned to cause said second piston to follow inward movement of said first piston, inward movement of both pistons moving said first and second shuttles to open communication between said inlets and outlets and close communication to said exhaust outlet, said second piston, with said mechanical means being positioned to cause movement thereof, having an outer circumferential surface exposed to fluid pressure at said first outlet to cause movement of said second piston in response to fluid pressures supplied to said first outlet;

said second piston having an inner portion and an outer portion, with said mechanical means being positioned to cause movement of said inner portion, said outer portion having the circumferential surface exposed to fluid pressure at said first outlet and being mounted in sliding engagement with said inner portion.

2. The structure of claim 1 further characterized in that said outer portion and said inner portion are substantially concentrically arranged and said outer portion includes an inwardly extending flange for engaging said inner portion of said second piston.

3. The structure of claim 2 further characterized in that said outer portion encircles said inner portion, and a seal is positioned between said inner and outer portions.

4. The structure of claim 3 further characterized by and including a peripheral seal between said outer portion and said housing.

5. The structure of claim 2 further characterized in that said mechanical means is positioned, in part, within said inner portion.

6. The structure of claim 5 further characterized in that said mechanical means includes a rod attached to said first piston and extending through said first shuttle to a position within said second piston, and a bridge member attached to said rod, adjacent one end thereof, and positioned to contact the inner portion of said second piston.

7. The structure of claim 1 further characterized by and including seal members attached to said first and second shuttles and positioned to form seals of said housing.

8. The structure of claim 7 further characterized by and including seals on said first and second pistons positioned to form seals with said first and second shuttles.

9. The structure of claim 8 further characterized in that the seals on said shuttles are positioned radially outside of the seals on the pistons.

10. The structure of claim 1 further characterized by and including a pair of springs positioned within said first piston, force applied to said first piston, from outside of said housing, compressing said springs and causing inward movement of said first piston.

11. The structure of claim 10 further characterized by and including a moveable cover in said first piston for closing said springs within said first piston.

12. The structure of claim 10 further characterized in that the springs in said first piston have different spring rates.

13. The structure of claim 1 further characterized in that the bottom surface of both pistons are flat circular contact surfaces for sealing against the seal members of the shuttles.

14. The structure of claim 1 further characterized in that the mechanical means engages at least one of the pistons along a spherically curved contact surface.

15. The structure of claim 14 further characterized in that the second piston supports a rod seat member, the concave surface of which engages the spherically curved bottom surface of the mechanical means when the first piston is forced into the valve.

16. The structure of claim 1 further characterized in that a circumferential groove is formed in the side of at least one of the pistons.

* * * * *

UNITED STATES PATENT OFFICE
CERTIFICATE OF CORRECTION

PATENT NO. : 3,923,346
DATED : December 2, 1975
INVENTOR(S) : Boleslaw Klimek and James W. Ma It is certified that error appears in the above-identified patent and that said Letters Patent are hereby corrected as shown below:

Column 2, line 68, "to" should read -- of --

Column 3, line 47, "secon" should read -- second --

Column 5, line 26, "portion 192" should read -- piston 192 --

Column 6, line 14, "the" should read -- air --

Column 6, line 18, "discribed" should read -- described --

Column 6, lines 21 and 22, "enclusive" should read -- exclusive --

Column 7, line 13, (Claim 7) after "seals" insert -- with portions --

Signed and Sealed this fourth Day of May 1976

[SEAL]

Attest:

RUTH C. MASON
Attesting Officer

C. MARSHALL DANN
Commissioner of Patents and Trademarks